United States Patent
Wilkin (10) Patent No.: US 9,849,746 B2
(45) Date of Patent: Dec. 26, 2017

(54) IMPACT REINFORCED COMPOSITE SPRING SEAT FOR A SHOCK ABSORBER

(71) Applicant: Tenneco Automotive Operating Company Inc., Lake Forest, IL (US)

(72) Inventor: Julien Wilkin, Fraiture (BE)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 0 days.

(21) Appl. No.: 15/006,363

(22) Filed: Jan. 26, 2016

(65) Prior Publication Data

US 2016/0137017 A1    May 19, 2016

Related U.S. Application Data

(63) Continuation-in-part of application No. PCT/EP2014/073627, filed on Nov. 4, 2014.
(Continued)

(51) Int. Cl.
*B60G 15/06* (2006.01)
*B60G 15/07* (2006.01)
*F16F 1/12* (2006.01)

(52) U.S. Cl.
CPC ......... *B60G 15/063* (2013.01); *B60G 15/062* (2013.01); *B60G 15/07* (2013.01);
(Continued)

(58) Field of Classification Search
CPC .... B60G 15/063; B60G 15/062; B60G 15/07; B60G 2202/312; B60G 2204/1242
See application file for complete search history.

(56) References Cited

U.S. PATENT DOCUMENTS

| 2,147,660 A | 12/1936 | Loewus |
| 3,857,726 A | 12/1974 | Van Gils |

(Continued)

FOREIGN PATENT DOCUMENTS

| DE | 102008043527 A1 | 5/2010 |
| DE | 10312085 B4 | 10/2014 |

(Continued)

OTHER PUBLICATIONS

International Search Report for application No. PCT/EP2014/073627 dated Mar. 2, 2015, 5 pages.
(Continued)

*Primary Examiner* — Vishal Sahni
(74) *Attorney, Agent, or Firm* — Howard & Howard Attorneys PLLC (57) ABSTRACT

A strut assembly including a spring to help absorb impacts and a shock absorber to help control motion of the spring is disclosed. The shock absorber includes a base assembly and is mounted between a top mount assembly and a knuckle. The top mount assembly mounts to the body of the vehicle and helps support the spring. An upper spring seat is adjacent the top mount assembly and receives one end of the spring. A lower spring seat formed of a composite material is supported by the base assembly and is adapted to support another end of the spring. The lower spring seat includes at least one reinforcing element having a plurality of reinforcing cords disposed between an upper surface and a lower surface for improving impact resistance thereof.

14 Claims, 7 Drawing Sheets

Related U.S. Application Data (60) Provisional application No. 62/107,647, filed on Jan. 26, 2015.

(52) U.S. Cl.
CPC .......... *F16F 1/12* (2013.01); *B60G 2202/312* (2013.01); *B60G 2204/1242* (2013.01); *B60G 2204/12422* (2013.01); *B60G 2206/013* (2013.01); *B60G 2206/7101* (2013.01)

(56) References Cited

U.S. PATENT DOCUMENTS

| | | | |
|---|---|---|---|
| 4,119,748 A * | 10/1978 | Verbauwhede | B29C 70/00 138/140 |
| 5,454,585 A | 10/1995 | Dronen et al. | |
| 6,126,155 A * | 10/2000 | Smith | B60G 15/067 267/220 |
| 6,398,201 B1 * | 6/2002 | Solomond | B60G 15/063 267/170 |
| 6,412,879 B1 * | 7/2002 | Ogoniek | B60B 35/006 301/125 |
| 6,692,012 B2 | 2/2004 | Fullenkamp et al. | |
| 8,109,492 B2 * | 2/2012 | Winocur | B60G 15/068 188/321.11 |
| 8,196,941 B2 | 6/2012 | Nowak | |
| 8,382,080 B2 * | 2/2013 | Suchta | F16F 1/368 188/321.11 |
| 8,496,383 B2 | 7/2013 | Viault et al. | |
| 8,939,439 B2 | 1/2015 | Corbett et al. | |
| 2003/0218286 A1 * | 11/2003 | Miyazaki | B60G 11/52 267/220 |
| 2004/0074589 A1 | 4/2004 | Gessler et al. | |
| 2010/0032877 A1 * | 2/2010 | Suchta | F16F 1/368 267/220 |
| 2011/0266765 A1 * | 11/2011 | Nowak | B60G 11/16 280/124.154 |
| 2012/0181127 A1 | 7/2012 | Keil et al. | |
| 2013/0052392 A1 | 2/2013 | Radlmayr et al. | |
| 2013/0147149 A1 | 6/2013 | Baker et al. | |
| 2014/0045400 A1 | 2/2014 | Vandewalle | |
| 2016/0185177 A1 | 6/2016 | Kaneko et al. | |

FOREIGN PATENT DOCUMENTS

| | | |
|---|---|---|
| EP | 567845 A1 | 11/1993 |
| EP | 1483137 B1 | 4/2007 |
| EP | 2960542 A1 | 12/2015 |
| GB | 2347906 A1 | 9/2000 |
| WO | 0144549 A1 | 6/2001 |
| WO | 03076234 A1 | 9/2003 |
| WO | 2004101909 A1 | 11/2004 |
| WO | 2005118263 A1 | 12/2005 |
| WO | 2009062764 A1 | 5/2009 |
| WO | 2013041254 A1 | 3/2013 |
| WO | 2013041255 A1 | 3/2013 |
| WO | 2016070905 A1 | 5/2016 |

OTHER PUBLICATIONS

English language abstract and machine-assisted English translation of DE 10312085 extracted from espacenet.com database Aug. 1, 2016, 5 pages.

English language abstract and machine-assisted English translation of DE102008043527 extracted from espacenet.com database Aug. 3, 2016, 16 pages.

English language abstract and machine-assisted English translation of EP0567845 extracted from espacenet.com database Aug. 3, 2016, 18 pages.

Mattheij, et al., Paul, "Tailored Fiber Placement-Mechanical Properties and Applications", Journal of Reinforced Plastics and Composites, Jun. 1998, pp. 774-786, vol. 17, No. 9, Technomic Publishing, US.

Crothers, et al., P.J., "Tailored Fibre Placement to Minimise Stress Concentrations", Composites Part A: Applied Science and Manufacturing, Jan. 1, 1997, pp. 619-625, vol. 28A, Elsevier Science Publishers B.V., Amsterdam, NL.

* cited by examiner

IMPACT REINFORCED COMPOSITE SPRING SEAT FOR A SHOCK ABSORBER

RELATED APPLICATIONS

This application is a continuation-in-part application of PCT Patent Application PCT/EP2014/073627, filed on Nov. 4, 2014, and this application claims priority to U.S. Provisional Patent Application No. 62/107,647, filed on Jan. 26, 2015, both of which are hereby incorporated by reference.

BACKGROUND OF THE INVENTION

1. Field of the Invention

The present invention relates generally to composite spring seats for shock absorbers, and more specifically, to impact reinforced composite spring seats for shock absorbers.

2. Description of the Related Art

Strut-type suspension systems are well known in the motor vehicle industry. A telescopic strut assembly normally incorporating a hydraulic damper is used as one of the locating members for a wheel of a motor vehicle. The most common form of a strut-type suspension is the MacPherson strut suspension system. The MacPherson strut assembly includes a coil spring located concentrically around the telescopic strut which is a shock absorber. The upper end of the MacPherson strut assembly includes a top mount assembly which is mounted to the vehicle body. These shock absorbers known in the related art typically include an outer tube, a piston, a rod, fluid, and one or more valves, whereby the piston is connected to the rod and travels within fluid in the outer tube in operation so as to dampen axial movement of the rod with respect to the outer tube.

The coil spring is located around the shock absorber and it extends between an upper spring seat which is a part of the top mount assembly and a lower spring seat which is attached, typically by welding, to the shock absorber of the strut assembly. The spring seats of the strut assembly have several functions for the suspension system. The spring seats support and maintain the correct position of the spring and support the loading on the spring under all driving conditions of the vehicle for the entire life of the vehicle.

The spring seats are supposed to be mechanically resistant during the life of the vehicle and resist braking loads, deformations, wear, abrasion, changing loads and hits by stones and other debris. The spring seats are also supposed to be environmental and corrosion resistant to different temperatures, different moisture levels, aggressive liquids and gases. The spring seats are supposed to ensure proper fixing of the components of the strut assembly, easy assembly of the strut assembly into the vehicle and with the other components of the strut assembly they resist any unwanted displacements and/or rotations. The design of the spring seats also ensures that the spring to spring seat contact does not promote or accelerate corrosion of the spring or the spring seat.

The related art lower spring seats were traditionally formed of a single piece of stamped or formed metal component. The single piece lower spring seat includes an annular disc defining an opening that supports the lower end of the spring and a tubular extension about the opening which extends from the annular disc. The tubular extension is designed to be welded or otherwise attached to the outer tube of the shock absorber.

It is a goal of the automotive industry to reduce the weight of vehicles and remove any unnecessary weight from components forming the vehicle. As one example, attempts have been made to manufacture the spring seats (as well strut assemblies themselves) from composite materials. When the spring seats are formed of composite materials, it is a challenge to have a sufficiently strong and stiff design with very limited creep. It is also necessary for the composite spring seat to be able to dissipate energy in case of spring failure. Attempts have been made to increase the thickness of the composite materials to give improved strength, but these attempts have not been successful due to the cost of the additional material. Further, the performance of the composite spring seats has to be able to withstand significant temperature differences, such as extreme heat and extreme cold. When the composite spring seats are exposed to extreme cold, the spring seats can become brittle and crack or shatter in case of spring impact. When the spring seats crack or shatter, the forces from the spring cause the spring seat to disengage from the shock absorber which can cause dangerous situations.

Another approach that has been utilized to accommodate forces on composite spring seats employs a steel or rubber pad positioned on the entire surface of the spring seat. The pad would absorb energy in case of spring failure. However, it is costly to have to use a pad to cover the entire spring seat. These related art composite spring seats and different approaches exhibit undesirable failure modes that can lead to dangerous and hazardous conditions when operating a vehicle that are not desirable.

SUMMARY OF THE INVENTION

The subject invention provides a strut assembly that comprises a top mount assembly, a shock absorber, and an upper spring seat supported by the top mount and a lower spring seat supported by the shock absorber. The upper and the lower spring seats are spaced apart from one another and a coil spring is disposed between the upper and the lower spring seats. The lower spring seat comprises an annular disc defining an opening. The lower spring seat is formed of a composite material and includes at least one reinforcing element disposed between an upper surface and a lower surface of the lower spring seat for improving impact resistance thereof.

The present invention overcomes the disadvantages in the related art. Specifically, the subject invention reinforces the composite lower spring seat with at least one reinforcing element having a plurality of spaced apart reinforcing cords to enhance the impact resistance of the lower spring seat. This prevents the composite lower spring seat from disengaging from the strut assembly when exposed to impacts from the spring at cold temperatures. The reinforcing element retains the composite lower spring seat about the shock absorber thereby avoiding the dangerous and hazardous condition. The subject invention improves the impact resistance of the lower spring seat in case of spring failure and does so without increasing the packaging or height of the spring seat and with very limited weight increase of the spring seat.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
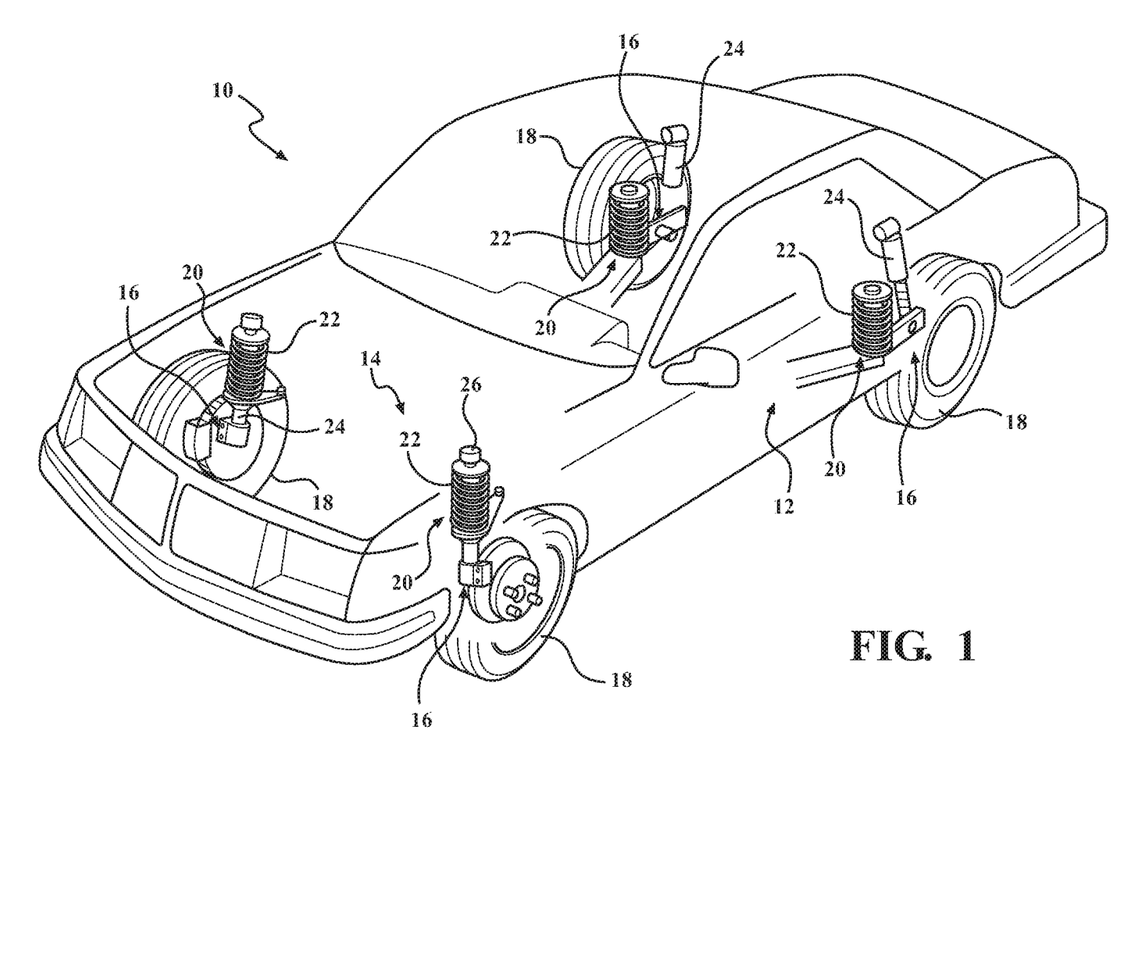
FIG. 1 is an enlarged perspective view of a generic vehicle showing a conventional suspension system.

With reference to the Figures, where like numerals are used to designate like structures throughout the several views, a portion of a conventional vehicle is illustrated at 10 in FIG. 1. The vehicle 10 includes a body 12 operatively attached to a suspension system 14 defined by four corner assemblies 16. The corner assemblies 16 are each assigned to a rotatably supported wheel 18 and are used to control the relative motion between the vehicle body 12 and wheel operation. The corner assemblies 16 each typically include strut assemblies 20 that include a spring 22 to help absorb impacts and a shock absorber 24 to help control motion of the spring 22 by damping movement between the wheel 18 and vehicle body 12.

As shown in FIG. 1, the springs 22 are compression springs and can be either concentrically aligned around the shock absorber 24, or spaced from the shock absorber 24. Thus, those having ordinary skill in the art will appreciate that the shock absorber 24 of the present invention can be used in connection with any suitable type of spring 22 without departing from the scope of the present invention. Moreover, given the number of different suspension systems 14 known in the related art, it will be appreciated that any suitable number of shock absorbers 24 could be used with any suitable number of springs 22. Further, the shock absorber 24 of the present invention is not limited for use in automotive applications, and could be used in any suitable application without departing from the scope of the present invention. By way of non-limiting example, the shock absorber 24 of the present invention could be used in connection with passenger or commercial vehicles, motorcycles, all-terrain vehicles, lawn care equipment, heavy-duty trucks, trains, airplanes, ships, construction vehicles and equipment, military vehicles, or any other suitable application, suspension-based or otherwise, without departing from the scope of the present invention.

Figure 2:
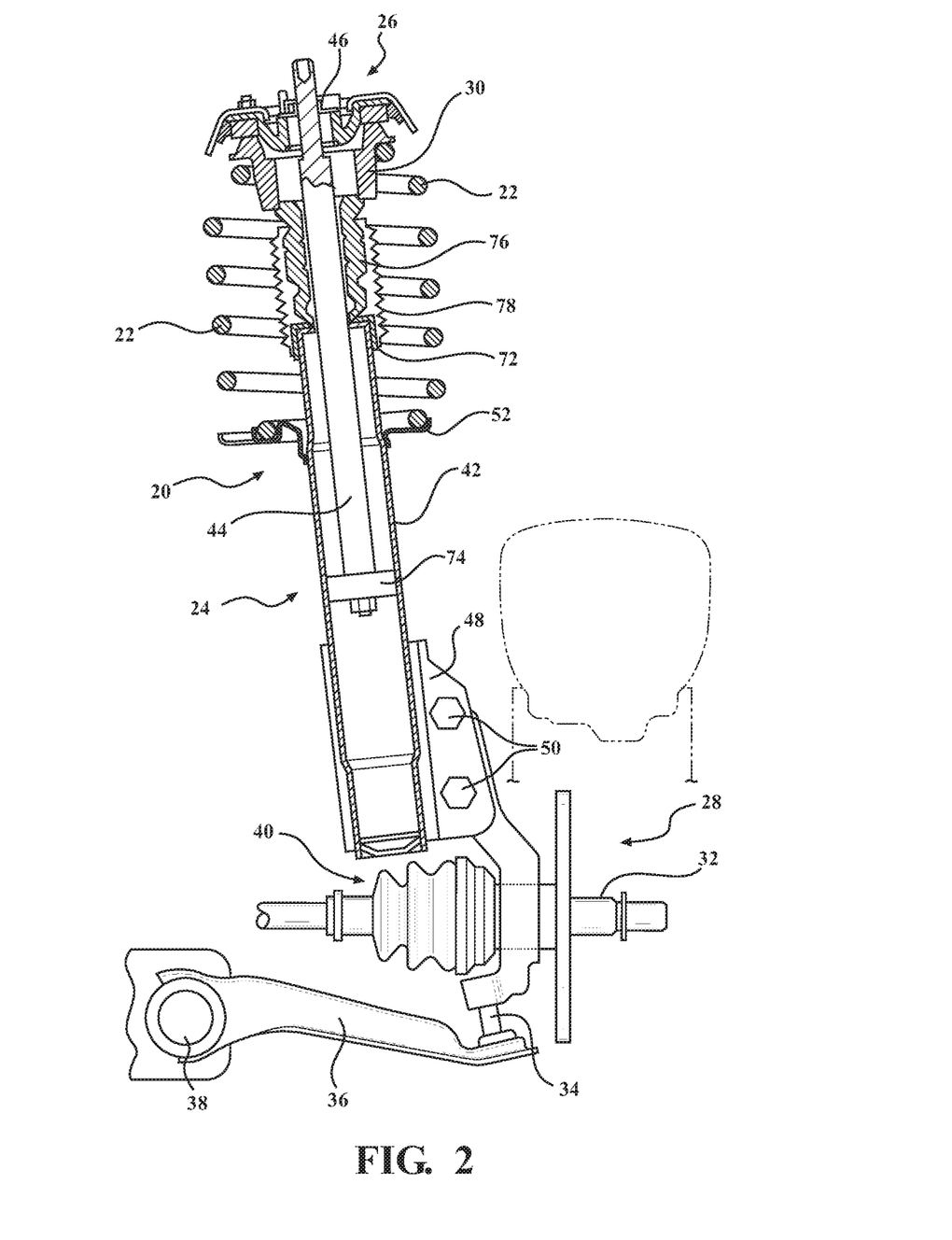
FIG. 2 is a partial sectional side view of a corner assembly of the suspension system of FIG. 1 having a conventional shock absorber.

Referring now to FIG. 2, a partial sectional view of the conventional corner assembly 16 is shown for exemplary purposes. Those having ordinary skill in the art will recognize the strut assembly 20 depicted in FIG. 2 as a MacPherson strut system, which includes the shock absorber 24 used to control movement between the vehicle body 12 and wheel 18 (not shown in FIG. 2). The shock absorber 24 is typically mounted between a top mount assembly, generally indicated at 26, and a knuckle 28. The top mount assembly 26 mounts to the body 12 of the vehicle 10 and helps support the spring 22. An upper spring seat 30 is adjacent the top mount assembly 26 and receives the spring 22.

The knuckle 28 typically includes a rotatably supported hub and bearing assembly 32, to which the wheel 18 is operatively attached. The knuckle 28 is also typically connected to a ball joint 34 mounted to a lower control arm 36 which, in turn, is pivotally supported by a frame member 38 of the vehicle 10. A continuously-variable joint member 40 translates rotational torque from the vehicle transmission (not shown, but generally known in the art) to the wheel 18 via the hub and bearing assembly 32. Thus, the wheel 18 can rotate in operation to drive the vehicle 10, and the suspension system 14 described above absorbs impacts and allows the wheel 18 to move with respect to the body 12.

The shock absorber 24 shown in FIG. 2 includes a base assembly 42 and a rod 44 concentrically-aligned with and supported within the base assembly 42 as described in greater detail below. The base assembly 42 of the present invention may be formed from a composite material or from a metal material. The base assembly 42 may be a unitary, one-piece component manufactured from a thermosetting fiber-filled polymer. Those having ordinary skill in the art will appreciate that the base assembly 42 could be manufactured from any suitable composite material, using any suitable type or amount of reinforcing fiber or filler, using any suitable manufacturing process, without departing from the scope of the present invention. Similarly, it will be appreciated that the base assembly 42 could be manufactured as or from any suitable number of discrete or congruent merging components, structures, or features, operatively attached to each other in any suitable way, without departing from the scope of the present invention.

The rod 44 typically includes a stepped and/or threaded end 46 adapted to secure the shock absorber 24 to the top mount assembly 26. However, it will be appreciated that the shock absorber 24 could be operatively attached to the top mount assembly 26, or to any suitable portion of the vehicle 10, or to any suitable member irrespective of the application, in any suitable way, without departing from the scope of the present invention.

The base assembly 42 has a mounting portion 48 adapted to attach the shock absorber 24 to the knuckle 28. While the base assembly 42 depicted in FIG. 2 is attached to the knuckle 28 with two bolts 50, those having ordinary skill in the art will appreciate that the base assembly 42 of the shock absorber 24 could be operatively attached to any suitable portion of the vehicle 10, or to any suitable member, in any suitable way, without departing from the scope of the present invention.

A lower spring seat 52 is supported by the base assembly 42 and is adapted to support the spring 22. The lower spring seat 52 receives one end of the spring 22. The lower spring seat 52 may be formed of the same material as the base assembly 42 or may be formed of a different material. The lower spring seat 52 may be integrally formed with the base assembly 42 or may be mounted and/or adhered and/or secured to the base assembly 42 after manufacturing as shown by mount 53. It is to be appreciated that if the lower spring seat 52 is integrally formed, the mount 53 may be omitted. Preferably, the lower spring seat 52 is formed of a composite material. The composite material may include fiber reinforced plastic, such as carbon fiber reinforced plastic or glass reinforced plastic.

Figure 3:
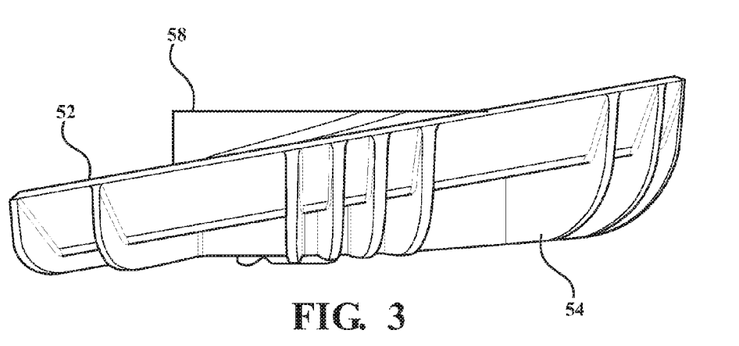
FIG. 3 is a side view of a lower spring seat formed according to the subject invention.
Figure 4:
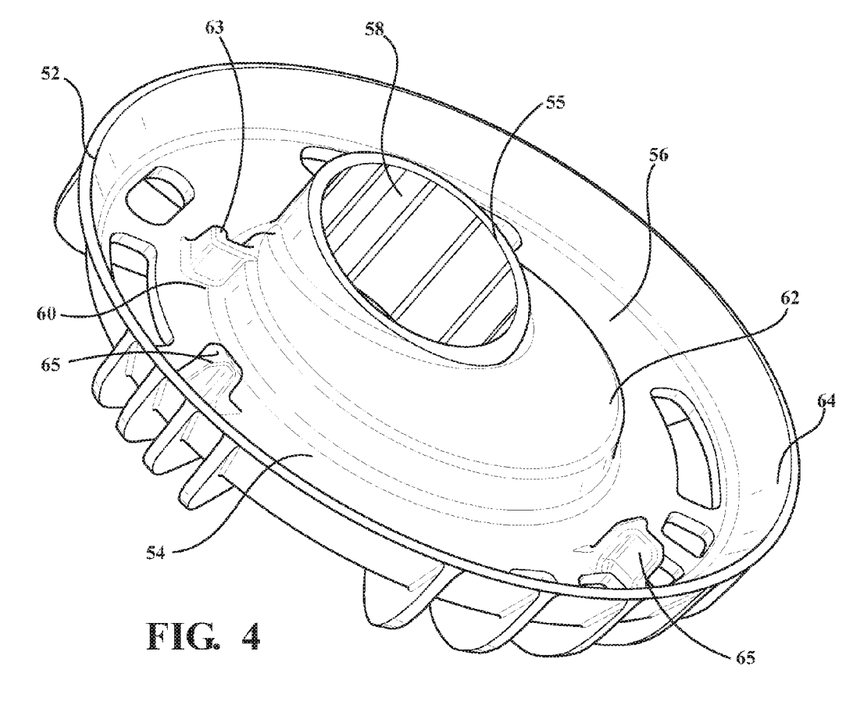
FIG. 4 is a top-down perspective view of the lower spring seat shown in FIG. 3.
Figure 5:
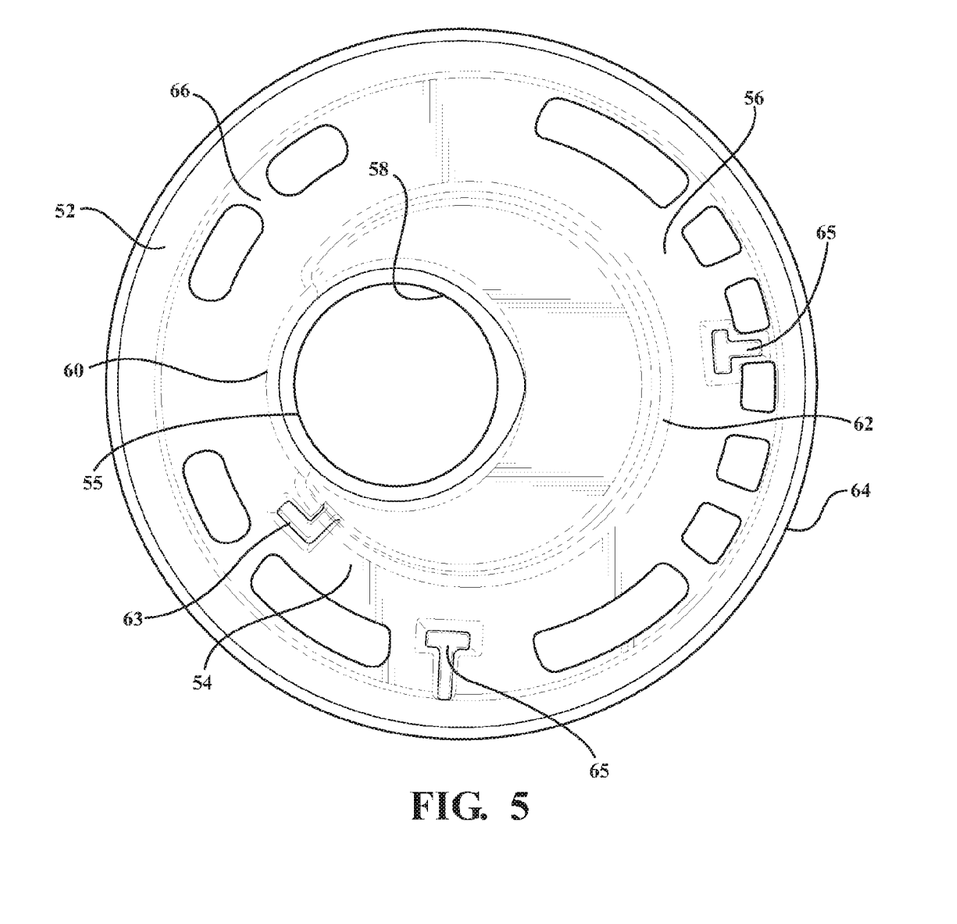
FIG. 5 is a top-down view of the lower spring seat shown in FIG. 3.

Referring to FIGS. 3-5, one embodiment of the lower spring seat 52 is shown. FIG. 3 is a side view of the lower spring seat 52, FIG. 4 is a top-down perspective view of the lower spring seat 52, and FIG. 5 is a top-down view of the lower spring seat 52. The lower spring seat 52 generally comprises an annular disc 54 defining an opening 55 and having an upper surface 57 and a lower surface 59. The spring seat 52 has a surface 56 and a tubular extension 58. It is to be appreciated that the surface 56 may be substantially planar such that it mates with the particular spring without deviating from the scope of the invention. As shown throughout the Figures, the surface 56 may include various structures extending therefrom for also engaging with the spring 22.

The base assembly 42 extends through the opening 55 in the annular disc 54 and is in abutting contact with the tubular extension 58. The surface 56 of the lower spring seat 52 further comprises a spring channel 60 for receiving the coil spring 22. The lower spring seat 52 may include other abutments for contacting and holding and/or engaging the spring 22 in the desired position. For example, the lower spring seat 52 may include a spring stop 63 and a spring guide 65 for engaging the spring 22.

As shown in FIG. 5, the spring channel 60 has an inner raised edge 62, an outer raised edge 64, and a flat portion 66 therebetween to help engage and retain the spring 22 therein. In the embodiment shown, the spring channel 60 is not concentric about the tubular extension 58. It is to be appreciated that the configuration of the lower spring seat 52 for engaging the spring 22 may be altered without departing from the subject invention.

Figure 6:
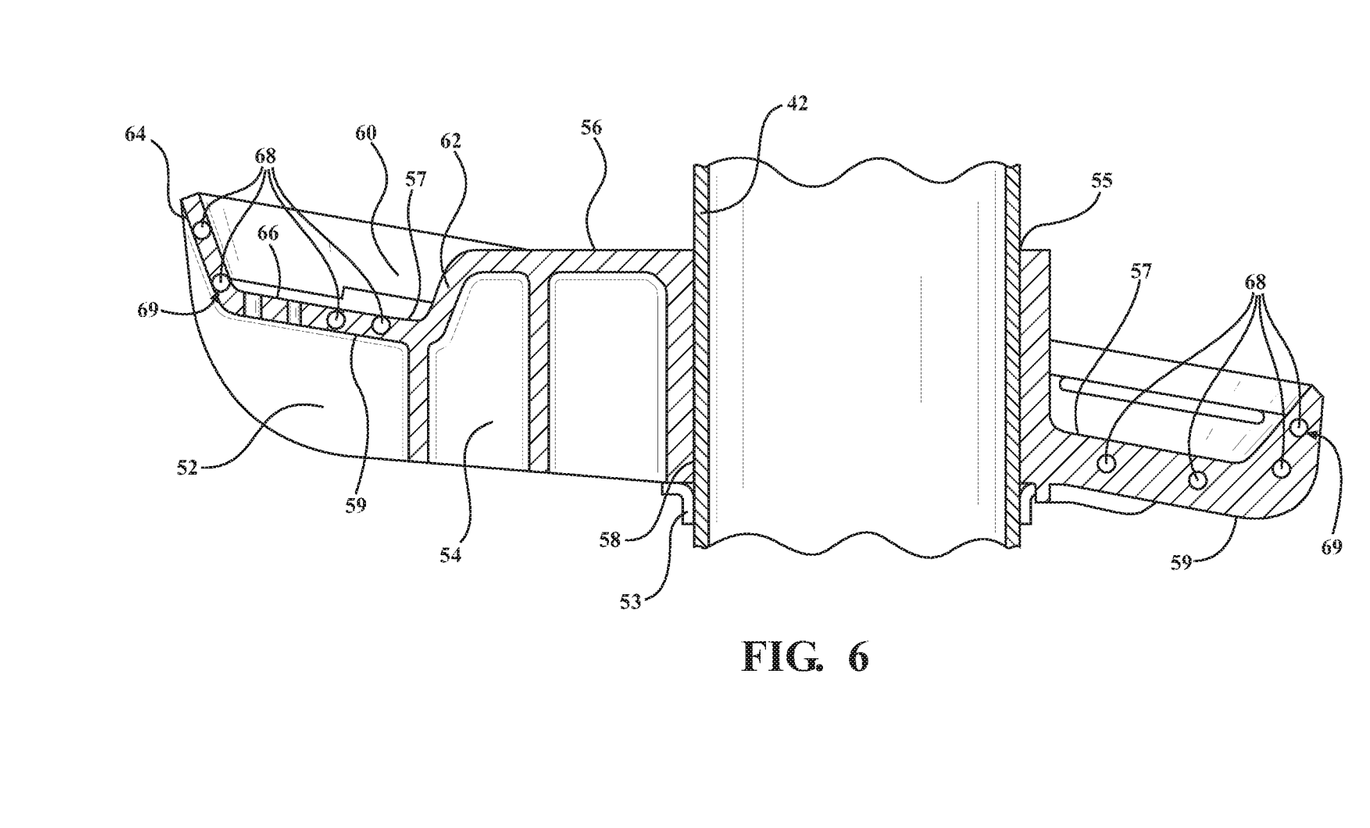
FIG. 6 is a cross-sectional view of the lower spring seat formed according to the subject invention with a base assembly extending therethrough.

FIG. 6 is a cross-sectional view of the lower spring seat 52 with the base assembly 42 extending through the tubular extension 58. The lower spring seat 52 includes at least one reinforcing element 69 having a plurality of reinforcing cords 68 disposed between the upper surface 57 and the lower surface 59 of the lower spring seat 52 for improving impact resistance thereof. The reinforcing element 69 is embedded within the composite material such that the reinforcing cords 68 are surrounded by the composite material and are spaced apart from one another. The reinforcing element 69 further comprises a carrier 71 supporting the reinforcing cords 68 during the forming of the lower spring seat 52, which may also add further strength. In other words, the spring 22 is constantly applying a force to the lower spring seat 52 and when the vehicle 10 is operated, the lower spring seat 52 is subjected to additional forces. It has been determined that composite material spring seats can fail under certain conditions. For example, when the composite material spring seats of the prior art are subjected to low temperatures and in case of spring failure, the composite material spring seats can crack, fracture, and/or shatter, which leads to the spring seat 52 completely disengaging from the strut assembly 20. This can be a very dangerous situation because the spring 22 is under substantial forces.

The subject invention overcomes these failures of the related art composite material spring seats. Specifically, the reinforcing element 69 provides more strength for the lower spring seat 52. When the lower spring seat 52 is subjected to lower temperatures and additional forces, the composite material of the lower spring seat 52 may crack or fracture, but the reinforcing element 69 prevents the lower spring seat 52 from shattering and completely disengaging the strut assembly 20. Therefore, the reinforced lower spring seat 52 avoids the dangerous situation that can occur with the related art composite material spring seats.

In order to adequately absorb and/or dissipate the forces from the spring 22 if the lower spring seat 52 were to crack, the reinforcing element 69 is preferably defined as being located adjacent the spring channel 60. It is believed, without being limited thereto, that the spring channel 60 receives the bulk of the forces or stresses from the spring 22. As shown in FIG. 6, the reinforcing element 69 has at least two cords 68 disposed in the flat portion 66 and at least one cord 68 in one of the raised edges 62, 64 to adequately reinforce the lower spring seat 52. More specifically, the subject invention illustrates two cords 68 of the reinforcing element 69 in the flat portion 66 and two cords 68 of the reinforcing element 69 in the outer raised edge 64. It is to be appreciated that the position of the reinforcing cords 68 may vary depending upon the manufacturing of the spring seat and/or depending upon the specific shape and configuration of the spring seat. In various tests of spring seats without reinforcement, sections of the flat portion 66 and the raised edges 62, 64 of the spring seat 52 fracture and break apart from the remainder of the spring seat. Whereas spring seats 52 with reinforcement formed according to the invention do not fracture when the composite material cracks.

The subject invention contemplates these differences so long as the reinforcing element 69 assists in retaining the lower spring seat 52 against the forces from the spring 22, especially if the lower spring seat 52 should crack or fracture. Preferably, the reinforcing cords 68 are substantially parallel throughout the surface 56. In this manner, the reinforcing cords 68 within the spring channel 60 are planar across the lower spring seat 52 and the reinforcing cords 68 within the raised edges 62, 64 are planar as well. The specific configuration of the reinforcing element 69 may vary without departing from the scope of the subject invention.

Figure 7:
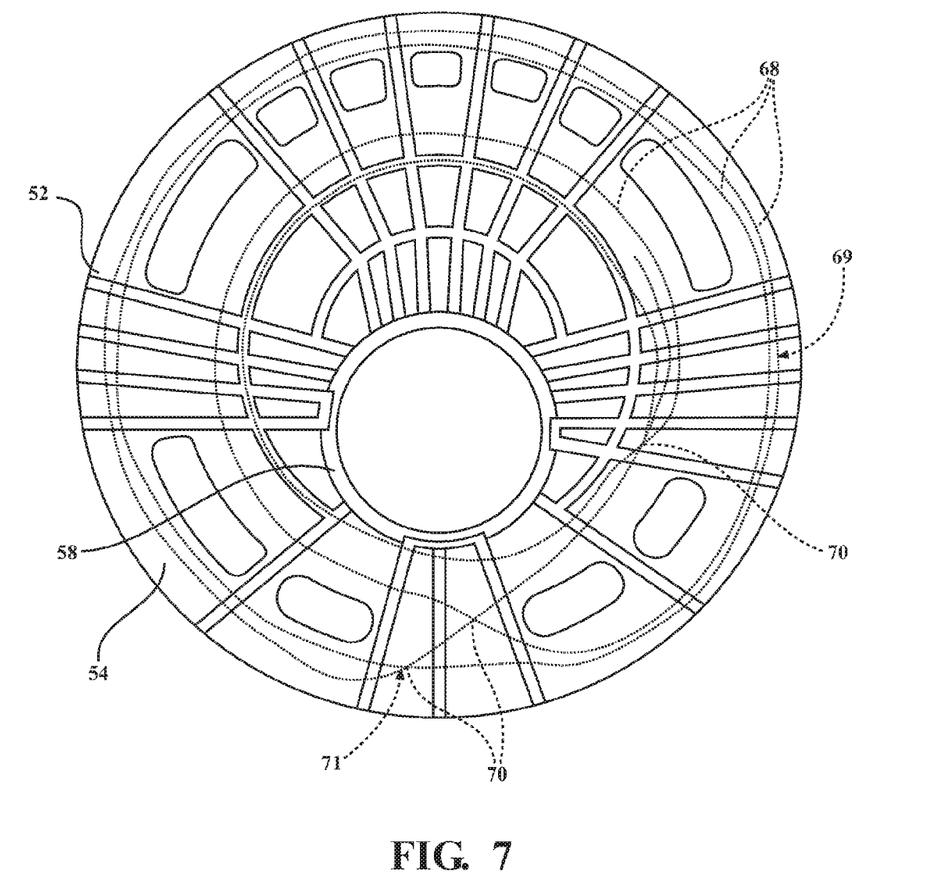
FIG. 7 is a top-down view of one embodiment of a lower spring seat formed according to the subject invention.

The reinforcing cord 68 is preferably a metal cord; however, other types of material may be used that have a similar strength and advantages as metal. The reinforcing element 69 may be multiple metal cords or a single, continuous metal cord or metal woven fabric. One particularly advantageous type of metal cord is a steel cord. In FIG. 6, the cross-sectional view of the lower spring seat 52 shows the single winding of metal cord in eight different spots on the lower spring seat 52. Referring to FIG. 7, a top-down view of one embodiment of the lower spring seat 52 is shown. The reinforcing element 69 is shown as a continuous winding within the lower spring seat 52. In manufacturing, the reinforcing element 69 may be positioned within a mold while the composite material forming the lower spring seat 52 is injected therein. The composite material forms about the reinforcing element 69 thereby forming the reinforced lower spring seat 52.

The placement of the reinforcing element 69 within the lower spring seat 52 can provide additional benefits based upon the specific placement therein. Therefore, one method of locating the reinforcing element 69 is to form at least one joint 70 where the metal cord crosses itself prior to placing the reinforcing element 69 into the mold. The joint 70 may be formed by welding the metal cord to itself or by other methods known to those of ordinary skill in the art, and the joint 70 acts like the carrier 71. The specific windings of the reinforcing elements can be controlled by forming one or more joints.

In addition to the specific location with the lower spring seat 52, the performance of the reinforcing element 69 can be further enhanced by providing a coating on the reinforcing element 69 for improving adherence to the composite material that forms the lower spring seat 52. Additionally or alternatively, the shape of the reinforcing cords 68 may improve the performance of the lower spring seat 52. For example, the reinforcing cord 68 may have a substantially circular cross-section or a polygonal cross-section.

The subject invention may be used with any various types and configurations of shock absorbers 24 that are known in to those of ordinary skill in the art. For example, referring back to FIG. 2, the shock absorber 24 may be a single tube or double tube shock absorber. The shock absorber 24 may include a rod guide 72, a piston assembly 74, and the rod 44 discussed above. The strut assembly 20 may further include common components such as a jounce bumper 76 and a dust shield 78.

Figure 8:
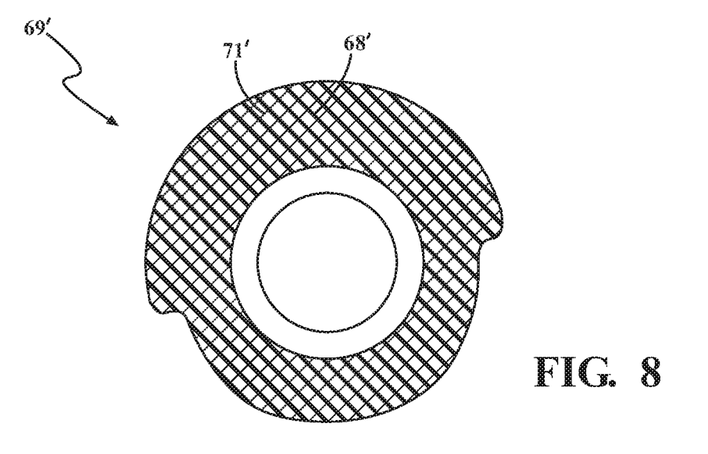
FIG. 8 is a top-down view of an alternative embodiment of the reinforcing element for use in the lower spring seat.
Figure 9:
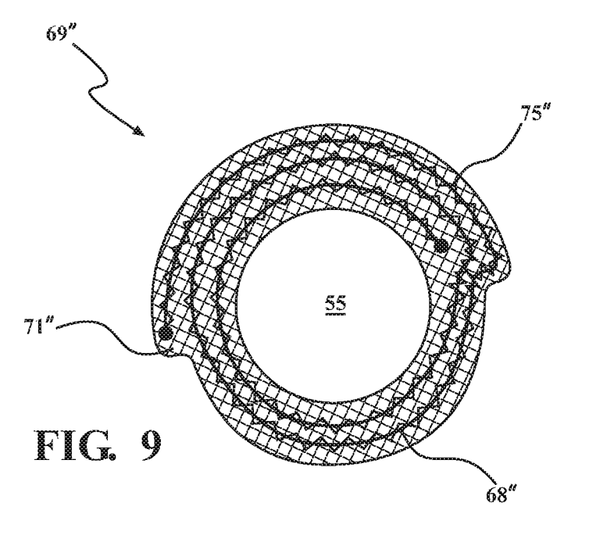
FIG. 9 is yet another embodiment of the reinforcing element.

Referring to FIG. 8, another embodiment of the reinforcing element 69' is shown as a metal woven fabric. Specifically, the reinforcing element 69' is a warp knitted steel cord 68' held by a yarn in weft carrier 71' for disposing in a composite spring seat. FIG. 9 shows yet another embodiment of a reinforcing element 69" prior to injection molding. The reinforcing element 69" comprises a non-metal carrier 71" on which steel cord 68" is stitched by means of stitching yarn 75". The path followed is curvilinear and circumscribes the opening 55 in a spiral way. The non-metal carrier 71" is a polyamide open scrim, the yarn 75" used is also made of polyamide, such that both are compatible with the material forming the lower spring seat 52. The stitch is a double yarn zig-zag lock stitch. The steel cord 68" is a single filament of diameter 0.95 mm of the quenched and partitioned type having a tensile strength of 2300 N/mm$^2$ and a yield stress of 1518 N/mm$^2$. Such a cord is particularly suited to make in a preform prior to stitching due to its combination of high diameter with low yield point. The number of stitches is about 2 per cm. By introducing the reinforcement fabric during molding with polyamide, an improved suspension cup could be made.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A strut assembly comprising:
   a top mount assembly;
   a shock absorber having a base assembly and a rod;
   an upper spring seat supported by said top mount and a lower spring seat supported by said shock absorber, said upper and said lower spring seats spaced apart from one another;
   a coil spring disposed between said upper and said lower spring seats;
   said lower spring seat comprising an annular disc defining an opening abutting said base assembly;
   said lower spring seat further comprising an upper surface and a lower surface and having a spring channel defined within said upper surface for receiving said coil spring;
   wherein said lower spring seat is formed of a plastic composite material; and
   a metal cord embedded within said composite material, said metal cord being a continuous winding making more than one pass around said annular disc opening and extending within said annular disc for improving impact resistance thereof.

2. The strut assembly as set forth in claim 1 further comprising a carrier supporting said metal cord.

3. The strut assembly as set forth in claim 1 wherein said continuous winding further comprises at least one joint where said reinforcing cord crosses itself.

4. The strut assembly as set forth in claim 3 wherein said joint is formed from welding.

5. The strut assembly as set forth in claim 1 wherein said metal cord further comprises a coating for improving adherence to said composite material.

6. The strut assembly as set forth in claim 1 wherein said metal cord has a substantially circular cross-section.

7. The strut assembly as set forth in claim 1 wherein said spring channel is further defined as having an inner raised edge, an outer raised edge, and a flat portion therebetween, and said at least one metal cord disposed in said flat portion and one of said raised edges.

8. The strut assembly as set forth in claim 1 wherein said spring channel is not concentric about said tubular extension.

9. The strut assembly as set forth in claim 2 wherein said metal cord is further defined as a steel cord and said carrier is further defined as a non-metal carrier supporting said at least one steel cord.

10. The strut assembly as set forth in claim 9 wherein said at least one steel cord is held to said non-metal carrier by stitches in a curvilinear trajectory.

11. The strut assembly as set forth in claim 10 wherein said curvilinear trajectory is in the form of a spiral.

12. The strut assembly as set forth in claim 11 wherein said stitches are double yarn zig-zag stiches.

13. The strut assembly as set forth in claim 12 wherein steel cord circumscribes said opening.

14. The strut assembly as set forth in claim 9 wherein said non-metal carrier is a polyamide open scrim and further comprises a yarn of a polyamide securing said steel cord thereto, wherein both said polyamide open scrim and said polyamide are compatible with the polymer matrix of said lower spring seat.

* * * * *